(12) United States Patent
Baum et al.

(10) Patent No.: US 8,650,489 B1
(45) Date of Patent: Feb. 11, 2014

(54) EVENT PROCESSING IN A CONTENT EDITOR

(75) Inventors: Geoffrey King Baum, Palo Alto, CA (US); Lalit Balchandani, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1105 days.

(21) Appl. No.: 11/788,673

(22) Filed: Apr. 20, 2007

(51) Int. Cl.
*G06F 3/00* (2006.01)
*G06F 3/01* (2006.01)

(52) U.S. Cl.
USPC ........... 715/723; 715/724; 715/725; 715/726; 715/716; 715/719; 715/720; 715/721

(58) Field of Classification Search
USPC .................................. 715/716–726
See application file for complete search history.

(56) References Cited

U.S. PATENT DOCUMENTS

| | | | | |
|---|---|---|---|---|
| 5,109,482 A * | 4/1992 | Bohrman | ....................... | 715/723 |
| 5,485,611 A * | 1/1996 | Astle | ...................... | 1/1 |
| 5,519,828 A * | 5/1996 | Rayner | ......................... | 715/723 |
| 5,627,765 A * | 5/1997 | Robotham et al. | ............ | 708/203 |
| 5,717,869 A * | 2/1998 | Moran et al. | .................... | 715/716 |
| 5,892,507 A * | 4/1999 | Moorby et al. | ................. | 715/205 |
| 5,915,067 A * | 6/1999 | Nonomura et al. | ............ | 386/247 |
| 5,966,121 A * | 10/1999 | Hubbell et al. | ................... | 715/726 |
| 6,188,396 B1 * | 2/2001 | Boezeman et al. | ............ | 715/202 |
| 6,222,925 B1 * | 4/2001 | Shiels et al. | ................... | 380/211 |
| 6,266,053 B1 * | 7/2001 | French et al. | .................. | 715/255 |
| 6,285,823 B1 * | 9/2001 | Saeki et al. | ..................... | 386/241 |
| 6,415,326 B1 * | 7/2002 | Gupta et al. | ................... | 709/231 |
| 6,549,221 B1 * | 4/2003 | Brown et al. | .................. | 715/854 |
| 6,683,649 B1 * | 1/2004 | Anderson | ................ | 348/333.05 |
| 6,760,042 B2 * | 7/2004 | Zetts | ............................ | 715/716 |
| 6,832,387 B2 * | 12/2004 | Grooters et al. | ................ | 725/39 |
| 6,956,574 B1 | 10/2005 | Cailloux et al. | | |
| 7,165,041 B1 * | 1/2007 | Guheen et al. | .................... | 705/26 |
| 7,337,403 B2 * | 2/2008 | Pavley et al. | ................... | 715/747 |
| 7,472,198 B2 * | 12/2008 | Gupta et al. | ................... | 709/231 |
| 7,496,857 B2 * | 2/2009 | Stata et al. | ..................... | 715/833 |
| 7,502,808 B2 * | 3/2009 | Hui et al. | .............................. | 1/1 |
| 7,546,544 B1 * | 6/2009 | Weber et al. | .................. | 715/769 |
| 7,694,225 B1 * | 4/2010 | Weber et al. | .................. | 715/723 |
| 7,702,014 B1 * | 4/2010 | Kellock et al. | ........... | 375/240.08 |
| 7,784,069 B2 * | 8/2010 | Boss et al. | ....................... | 725/16 |
| 7,823,055 B2 * | 10/2010 | Sull et al. | ...................... | 715/201 |
| 7,827,490 B2 * | 11/2010 | Kapur et al. | ................... | 715/716 |
| 8,065,604 B2 * | 11/2011 | Blankinship | .................. | 715/229 |
| 8,150,237 B2 * | 4/2012 | Hamada et al. | ................ | 386/337 |
| 8,170,396 B2 * | 5/2012 | Kuspa et al. | ................... | 386/282 |
| 2002/0069218 A1 * | 6/2002 | Sull et al. | ................... | 707/501.1 |
| 2002/0180774 A1 * | 12/2002 | Errico et al. | ................... | 345/721 |
| 2002/0194618 A1 * | 12/2002 | Okada et al. | .................. | 725/132 |
| 2003/0052910 A1 * | 3/2003 | Shiiyama | ...................... | 345/719 |

(Continued)

*Primary Examiner* — Steven B Theriault
(74) *Attorney, Agent, or Firm* — Kilpatrick Townsend & Stockton LLP (57) ABSTRACT

A content manager an indication that a branch event is to be included in a video presentation. In conjunction with the branch event, the content manager also receives a selection of a plurality of video segments to be associated with the branch event. Each video segment defines video content to be rendered during playback (e.g., by a rendering application) of the video presentation upon selection of a branch choice corresponding to that video segment. Additionally, the content manager encodes the plurality of video segments and the corresponding branch choices as a branch event in the video presentation.

25 Claims, 8 Drawing Sheets

(56) References Cited

U.S. PATENT DOCUMENTS

| | | | |
|---|---|---|---|
| 2004/0001106 A1* | 1/2004 | Deutscher et al. | 345/838 |
| 2004/0125124 A1* | 7/2004 | Kim et al. | 345/716 |
| 2004/0125150 A1* | 7/2004 | Adcock et al. | 345/810 |
| 2004/0128317 A1* | 7/2004 | Sull et al. | 707/104.1 |
| 2004/0143848 A1* | 7/2004 | Kerri Yu et al. | 725/88 |
| 2004/0201610 A1* | 10/2004 | Rosen et al. | 345/731 |
| 2004/0230655 A1* | 11/2004 | Li et al. | 709/205 |
| 2005/0091576 A1* | 4/2005 | Relyea et al. | 715/502 |
| 2005/0105888 A1* | 5/2005 | Hamada et al. | 386/95 |
| 2005/0193408 A1* | 9/2005 | Sull et al. | 725/32 |
| 2005/0254363 A1* | 11/2005 | Hamada et al. | 369/47.1 |
| 2006/0004685 A1* | 1/2006 | Pyhalammi et al. | 707/1 |
| 2006/0064716 A1* | 3/2006 | Sull et al. | 725/37 |
| 2006/0064733 A1* | 3/2006 | Norton et al. | 725/135 |
| 2006/0149781 A1* | 7/2006 | Blankinship | 707/103 R |
| 2007/0033515 A1* | 2/2007 | Sull et al. | 715/500.1 |
| 2007/0033632 A1* | 2/2007 | Baynger et al. | 725/135 |
| 2007/0044010 A1* | 2/2007 | Sull et al. | 715/500.1 |
| 2007/0099684 A1* | 5/2007 | Butterworth | 463/1 |
| 2007/0118801 A1* | 5/2007 | Harshbarger et al. | 715/730 |
| 2007/0201558 A1* | 8/2007 | Xu et al. | 375/240.22 |
| 2007/0230807 A1* | 10/2007 | Shiiyama | 382/239 |
| 2008/0253735 A1* | 10/2008 | Kuspa et al. | 386/52 |
| 2009/0177301 A1* | 7/2009 | Hayes | 700/94 |
| 2009/0210779 A1* | 8/2009 | Badoiu et al. | 715/230 |
| 2010/0095211 A1* | 4/2010 | Kenvin et al. | 715/723 |
| 2010/0192219 A1* | 7/2010 | Carvajal et al. | 726/19 |
| 2011/0119588 A1* | 5/2011 | Siracusano, Jr. | 715/723 |
| 2011/0197131 A1* | 8/2011 | Duffin et al. | 715/720 |
| 2012/0102387 A1* | 4/2012 | Badoiu et al. | 715/230 |

* cited by examiner

EVENT PROCESSING IN A CONTENT EDITOR

BACKGROUND

Conventional video editing software applications enable users to edit, manage and create various types of video media content for personal and/or professional purposes. Based on use of such applications, digital videos, images and sounds may be modified and combined in conventional video editing software to produce a desired multi-media effect.

Typically, a user can access various types of digital content on a local computer using a corresponding graphical user interface (e.g., including menus, icons, toolbar functions, etc.) associated with an executed video editing software application. In such a context, as mentioned above, the video editing software typically enables users to add graphics (e.g., superimpose captions, titles, etc.) and effects to the edited video media content. Such effects may include features such as a black and white mode, blurring of images and video frames, transition schemes for transitioning between video clips, and/or similar methods suitable for producing creative digital video content.

SUMMARY

Conventional content editing and rendering applications suffer from a variety of deficiencies. In particular, conventional content editing and rendering software is single-user desktop based and does not allow a producer to create interactive content (e.g., an interactive video presentation such as a commercial) which would enable an end user to modify or alter the outcome of the video presentation during playback in a video player (e.g., web browser, Flash® Player, etc.). As a result, end users are limited in that they have no control over the flow or outcome of produced content, in particular video content, and cannot integrate their own creative thinking and ideas into the content during playback.

A further deficiency results from the fact that content producers (e.g., advertisers, television producers, etc.) cannot reap the benefit of real-time feedback that end users can provide by interactively selecting various flows and outcomes of the content according to the end user's preferences and proclivities. The real-time feedback can provide quick and valuable information regarding end user preferences for such purposes as market research and audience testing. With real-time audience feedback, advertisers and media producers can quickly adjust advertising campaigns, alternate movie ending, etc., that are targeted for specific audiences and demographic groups according to the feedback data.

Embodiments disclosed herein can significantly overcome such deficiencies and/or other deficiencies in the prior art. For example, embodiments herein include a method for producing interactive media content (e.g., movies, commercials, etc.) using a networked video editing system that can provide end users with the capability of determining, in real-time, the flow and outcome of the content during playback in a video player. The producer (e.g., advertiser, website administrator, etc.) of the interactive content can select, for example, different scenes of a movie to be associated with an instance in a movie (e.g., alternate endings of a movie) so that an end user can interactively choose from those scenes to determine the outcome of the movie. Furthermore, embodiments disclosed herein provide methods and systems for collecting data associated with the choices that end users make when viewing the interactive content. The collected data can therefore provide end user statistics to the producers of the content (e.g., 75% of end users selected Scene B for the ending of the movie). As such, the statistical information, along with user preference and demographical data, can be used for real-time market research and audience testing.

More specifically, and in accordance with one example embodiment disclosed herein, a content-based creation and delivery platform enables viewers (e.g., end users of a web browser) to select scenes from a pre-defined list based on a set of parameters such as, for example, personal preferences, popularity of certain video clips, and the like. By selecting different scenes (e.g., video clips or segments), viewers can change the flow or outcome of the content so that the end result (e.g., a video presentation) branches in a variety of directions. In this manner, viewers are enabled to select their desired scene at a number of locations or instances within the content depending on how the producer (e.g., movie director, web administrator, etc.) structures the decision tree of content choices. Moreover, in one example embodiment the viewers (e.g., end users) can vote on their preferred flow of scenes which, in some circumstances, can impact how subsequent viewers would view the content.

Similarly, as in one example embodiment, viewers (e.g., end users) are enabled to edit and enhance designated scenes according to a pre-defined set of parameters as determined by the publisher, producer, administrator, etc., of the content. As a result, the viewer has the capability to impact more than just the direction of the content (e.g., video presentation), but also the actual look and feel of the content. Furthermore, as in one embodiment, viewers can submit and/or share their version of the content (e.g., a hybrid between user-generated and professionally produced content) with other users, producers, publishers, etc. In other words, by enabling viewers/users to edit, vote and share content, publishers can utilize this feedback to perform real-time market research and audience testing similar to the embodiments discussed above.

Typically, as in one specific embodiment, the end user or viewer can modify and alter editable video content through a remote client (e.g., a desktop located at home), wherein the end user or viewer obtains the editable content (or branch choice content as previously discussed) from a remote server (e.g., web server).

In one example embodiment, a content manager receives an indication that a branch event is to be included in a video presentation. In conjunction with the branch event, the content manager also receives a selection of a plurality of video segments to be associated with the branch event. Each video segment defines video content to be rendered during playback (e.g., by a rendering application such as a web browser) of the video presentation upon selection of a branch choice corresponding to that video segment. Typically, the content manager receives the branch event and corresponding video segments from a production user (e.g., advertiser, movie producer, website administrator, etc.). The content manager also encodes the plurality of video segments and the corresponding branch choices as a branch event in the video presentation (e.g., in an eXtensible Markup Language "XML" file) for, as an example, transmission across a network (e.g., the Internet) to an end user.

According to another example embodiment, the content manager (or a statistics manager executing separately or in conjunction with the content manager) collects user data associated with the selection of branch choices in the video presentation. Upon collecting the user data, the content manager and/or statistics manager determines statistics of branch choice selections by users for the video presentation. The content manager and/or statistics manager then initiates a request to a rendering application (e.g., web browser across a network) to disable user selection of a branch choice in the video presentation based on the statistics of branch choice selection. For example, the content manager can disable the branch choice selection in order to control the flow and outcome of the video presentation (e.g., by not allowing the end user to select an alternate video segment) as determined by analysis of the statistical data.

In another embodiment, the content manager receives a selection of an editable video segment to be associated with the branch event. The editable video segment defines video content that can be edited by a user during playback of the video presentation. In addition, the content manager receives a selection of an editing policy that can be applied to the editable video segment during playback of the video presentation. The editing policy specifies editing features (e.g., transitioning effects, superimposition of caption and/or subtitles, etc.) in the rendering application that can be enabled during user edit of the editable video segment in accordance with example embodiments disclosed herein. The content manager also encodes the editable video segment and respective editing policy as a branch event in the video presentation (e.g., in an XML file).

According to another example embodiment, a rendering application (e.g., web browser, Flash® Player, etc.) performs playback of a video presentation including a branch event that defines a plurality of video segments. Similar to the embodiment discussed above, each video segment defines video content to be rendered during playback of the video presentation upon selection of a branch choice corresponding to that video segment. During playback of the video presentation, the rendering application identifies a branch event in the video presentation. In response to identifying the branch event, the rendering application presents branch choices (e.g., as thumbnail representations) to the end user of the rendering application for each video segment defined for that branch event. In one embodiment, the rendering application receives, from the end user, a selection of a branch choice that corresponds to a video segment. Having received the selection of the branch choice, the rendering application renders the video segment that corresponds to the selection of the branch choice as part of the video presentation.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Still other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein may be employed in data communications devices and other computerized devices and software systems for such devices such as those manufactured by Adobe Systems Incorporated of San Jose, Calif.

As discussed above, techniques herein are well suited for use in content production and distribution associated with a video editor. However, it should be noted that embodiments herein are not limited to use in such applications and that the techniques discussed herein are well suited for other applications as well.

Note that each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Generally, embodiments disclosed herein relate to a content-based creation and delivery platform that enables viewers (e.g., end users of a web browser) to select scenes from a pre-defined list based on a set of parameters such as, for example, personal preferences, popularity of certain video clips, and the like. By selecting different scenes (e.g., video clips or segments), viewers can change the flow or outcome of the content so that the end result (e.g., a video presentation) branches in a variety of directions. In this manner, viewers are enabled to select their desired scene at a number of locations or instances within the content depending on how the producer (e.g., movie director, web administrator, etc.) structures the decision tree of content choices. Furthermore, as in one example embodiment, the viewers (e.g., end users) can vote on their preferred flow of scenes which, in some instances, can impact how later viewers would see the content.

Similarly, in accordance with example embodiments disclosed herein, viewers (e.g., end users) are enabled to edit and enhance designated scenes according to a pre-defined set of parameters as determined by the publisher, producer, administrator, etc., of the content. As a result, the viewer can impact more than just the direction of the content (e.g., video presentation), but also the actual look and feel of the content with producer/publisher consent. Furthermore, as in one embodiment, viewers can submit and/or share their version of the content (e.g., a hybrid between user-generated and professionally produced content) with other users, producers, publishers, etc. In other words, by enabling viewers/users to edit, vote and share content, publishers can utilize this feedback to perform real-time market research and audience testing.

Figure 1:
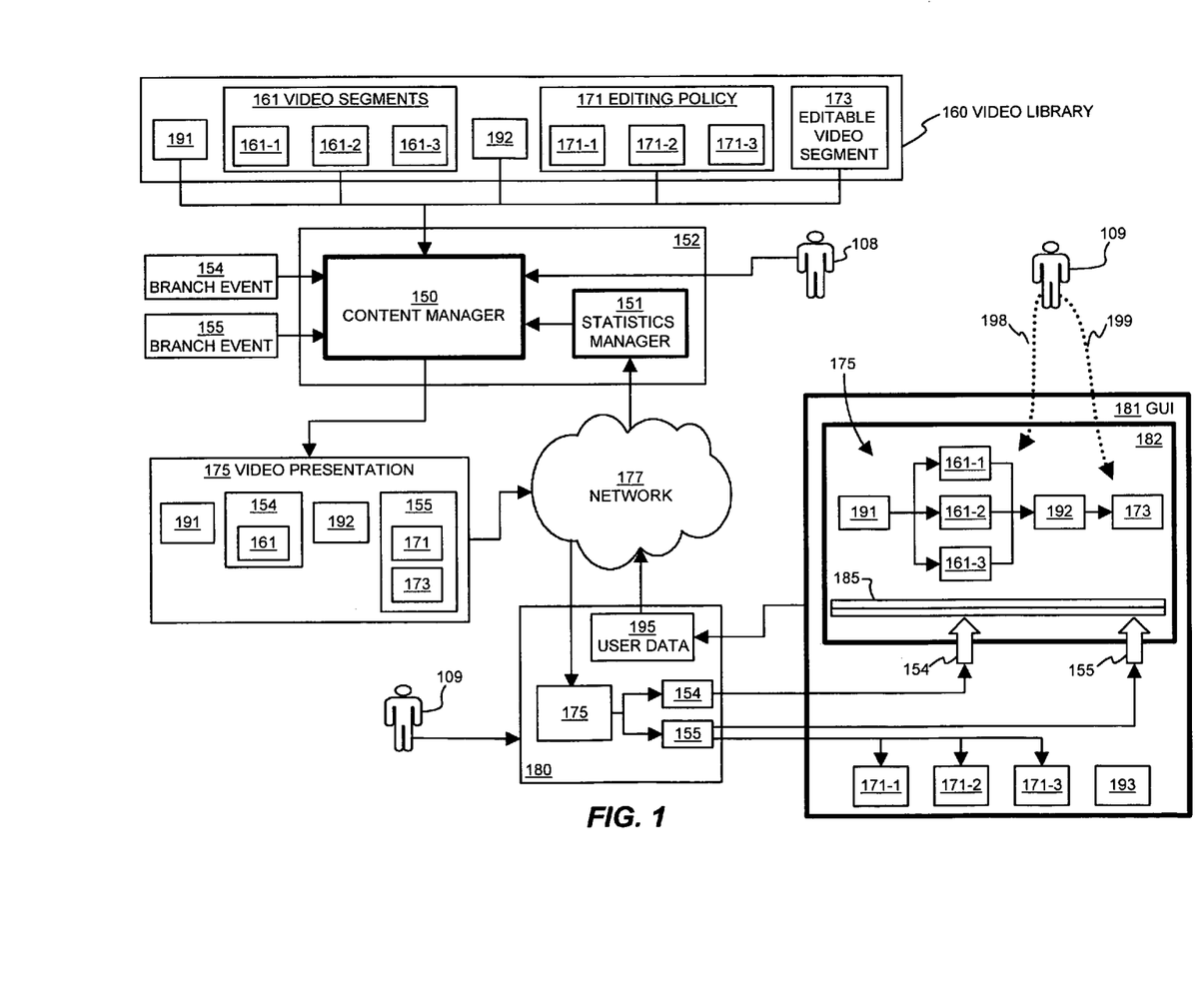
FIG. 1 is an example block diagram of a content production and distribution environment in accordance with one example configuration according to embodiments herein.

More specifically, FIG. 1 is a block diagram illustrating an example embodiment of a content production and distribution environment 140. The content production and distribution environment 140 generally includes a content production platform 152 having a content manager 150 and statistics manager 151. A production user 108 (e.g., video producer, web hosting administrator, etc.) interacts with the content production platform 152, namely the content manager 150, to create, produce and distribute content that can be dynamically viewed, modified, etc., by an end user 109 of a rendering application 180 (e.g., Internet Explorer®, Flash® Player, etc.). In operation, the content manager 150 can access a content library 160 that contains various digital media files and formats (e.g., video clips, images, audio clips, etc.). In the example embodiment of FIG. 1, the content library 160 contains static video segments 191 and 192, selectable video segments 161 (e.g., video segments 161-1, 161-2 and 161-3) and an editable video segment 173. In addition, the content library contains an editing policy 171 that identifies various editing features 171-1, 171-2 and 171-3, that can be enabled and/or disabled in a rendering application (e.g., Flash® Player, web browser, etc.) for user edit of the editable video segment 173. Furthermore, the content production platform 152 includes a statistics manager 151 that is discussed in more detail below.

According to one example embodiment, the production user 108 can utilize the content platform 145 to create and/or produce interactive content (e.g., video presentation 175) wherein an end user 109 can pick and choose from a selection of video clips (as determined by the production user 108) at predetermined instances (or branch events) during playback of the video presentation 175. Also, in accordance with an example embodiment, the production user 108 can select an editable video segment 173 and corresponding editing policy 171 (e.g, having various editing features 171-1, 171-2 and 171-3, that may be enabled and/or disabled) for inclusion in the video presentation 175. As such, an end user 109 can edit the editable video segment 173 during playback of the video presentation (e.g., at corresponding branch event 155 shown in FIG. 1).

Still referring to FIG. 1, the content manager 150 receives indications of branch events 154 and 155 (e.g., as instructed by production user 108) for insertion into video presentation 175. Branch event 154 indicates to the rendering application 180 that, during playback of video presentation 175, the user 109 should be prompted to select a video clip from the selection of video segments 161 upon completion of the rendering of static video segment 191. Moreover, branch event 154 is encoded and stored in the video presentation 175 (e.g., as part of an Edit Decision List "EDL" in an extensible markup language "XML" file format) in a manner such that a rendering application 180 can identify: i) at what instance in the playback of the video presentation 175 the branch event 154 should occur, and/or ii) which video segments should be presented to the end user 109 at the branch event 154.

In accordance with another example embodiment, the content manager receives an indication (e.g., as instructed by production user 108) of branch event 155. Branch event 155 indicates to the rendering application that, during playback of video presentation 175, the end user 109 should have the capability to edit the editable video segment 173 according to editing policy 171. Furthermore, branch event 155 is encoded and stored in the video presentation 175 (e.g., as part of the EDL in an XML file format) in a manner such that the rendering application 180 can identify: i) at what instance in the playback of the video presentation 175 the branch event 155 should occur, ii) the editable video segment(s) 173 that can be edited by end user 109, and/or iii) the corresponding editing policy 171 that instructs the rendering application 180 to enable and/or disable predefined editing features 171-1, 171-2, 171-3, etc., for user edit of the editable video segment 173.

Referring again to FIG. 1, the example embodiment shows the video presentation 175 encoded and stored in a file format (e.g., XML) that is suitable for transmission from the content manager 150 to the rendering application 180 via network 177 (e.g., local area network, wide area network, the Internet, etc.). As shown, the video presentation 175 represents an Edit Decision List containing, in sequential order, static video segment 191, branch choice 154 and corresponding video segments 161, static video segment 192, and branch event 155 and corresponding editable video segment 163 and editing policy 171 (including the editing features 171-1, 171-2 and 171-3). For example, upon an end user 109 request for the video presentation 175, the content manager 150 transmits the video presentation 175 (e.g., as an XML file) to the rendering application 180 such that the rendering application 180 can receive and interpret the encoding of the video presentation 175 for playback in a graphical user interface 181.

As shown in the example embodiment of FIG. 1, branch events 154 and 155 are interpreted and identified in the rendering application 180. For purposes of illustrating the temporal correlation between the branch events 154, 155 and the video presentation 175, the branch events 154, 155 are shown as arrows that indicate a respective instance in the video presentation 175 according to a video presentation timeline 185.

For example, the arrow representing branch event 154 represents the instance during the playback of the video presentation 175 (e.g., upon completion of static video segment 191) that corresponds to the prompting and subsequent selection of video segments 161 (e.g., branch choices) by the end user 109. Likewise, the arrow representing branch event 155 represents the instance during the playback of video presentation 175 (e.g., upon completion of static video segment 192) when the end user 109 has the capability to edit the editable video segment 173 according to editing policy 171.

In the example embodiment of FIG. 1, the editing policy 171 instructs the rendering application 180 to enable editing features 171-1, 171-2 and 171-3 (e.g., features may include transition effects, superimposition of captions and/or subtitles, insertion of pre-composed content created by end user 109, etc.) Note that editing feature 193 in graphical user interface 181 was not enabled by rendering application 180 since editing feature 193 was not included in the video presentation 175 (e.g., the XML file)

Still referring to the example embodiment of FIG. 1, in response to receiving branch choice selections 198 and 199 (e.g., associated with branch events 154 and 155, respectively) from end user 109, the rendering application 180 processes the branch choice selections 198, 199 as user data 195 for transmission to video production platform 145 (more specifically statistics manager 151) via network 177 (e.g., the Internet).

In addition to the above-mentioned features, FIG. 1 also depicts the rendering application 180 collecting user data 195 from end user 109 (e.g., before, during or after playback of video presentation 175). The user data 195 includes various parameters such as, for example, branch choice selections 198 and 199, end user 109 preferences (e.g., movie and music genres, editing feature preferences, etc.), and/or user attribute information (e.g., demographical data), etc. The rendering application 180 processes the user data 195 to encode and store the parameters in a file format (e.g., XML). Upon collecting and processing the user data 195, or upon receiving a request for user data 195 from either the statistics manager 151 and/or the content manager 150, the rendering application 180 transmits the user data 195 in the file format to the statistics manager 151 via network 177 (e.g., the Internet). In turn, the statistics manager 151 performs statistical analyses on the user data 195 along with user data form other end users, if available, for purposes such as, for example, real-time market research and audience testing.

For example, in one embodiment the statistics manager 151 processes end user data from multiple end users to calculate a most popular video segment associated with a branch event. By determining the most popular video segment, the statistics manager 151 (either by itself or in conjunction with the content manager 150) prepares a final video presentation version that includes the most popular video segment in lieu of the corresponding branch event that was previously a part of the video presentation.

Figure 2:
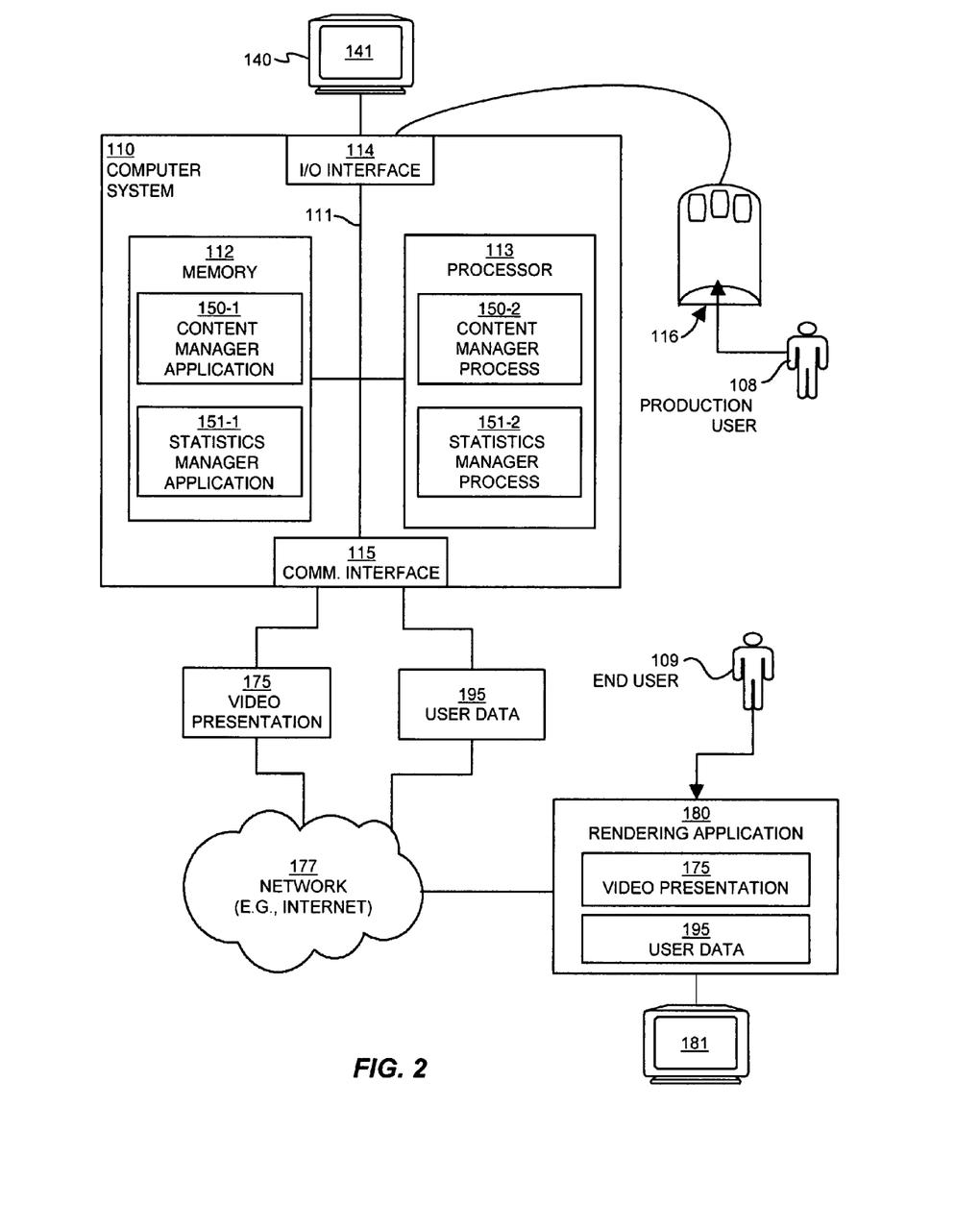
FIG. 2 is an example block diagram of a computerized system configured with an application including a content manager and statistics manager in communication with a server across a network in accordance with one example configuration according to embodiments herein.

FIG. 2 is a block diagram illustrating example architecture of a computer system 110 (e.g., content production platform 152) that executes, runs, interprets, operates or otherwise performs a content manager 150 and statistics manager 151. The computer system 110 may be any type of computerized device such as a personal computer, workstation, portable computing device, console, laptop, network terminal, client, etc. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a pointing device, keyboard, mouse, etc.) couples to processor 113 through I/O interface 114, and enables a user 108 (e.g., production user) to provide input commands and generally control the graphical user interface 141 that the content manager 150 provides for display on display 140. The communications interface 115 enables the computer system 110 to communicate with other devices (e.g., other computers such as rendering application 180) over a respective a network 177 (e.g., a local area network, the Internet, etc.).

The memory system 112 can generally be any type of computer readable medium and (in this example) is encoded with a content manager applicaiton 150-1 and statistics manager application 151-1. The content manager application 150-1 and statistics manager application 151-1 may be embodied as software code such as data and/or logic instructions (e.g., code stored in the memory or on another computer readable medium such as a removable disk) that supports processing functionality according to different embodiments described herein.

During operation of the computer system 110, the processor 113 accesses the memory system 112 via the interconnect 111 in order to launch, run, execute, interpret or otherwise perform the logic instructions of the content manager application 150-1 and statistics manager application 151-1. Execution of content manager application 150-1 and statistics manager application 151-1 in this manner produces processing functionality in a content manager process 150-2 and statistics manager process 151-2, respectively. In other words, the content manager process 150-2 and statistics manager process 151-2 represent one or more portions of runtime instances of the content manager application 150-1 and statistics manager application 151-1, respectively, performing or executing within or upon the processor 113 in the computer system 110 at runtime.

It should be noted that the statistics manager process 151-2 can reside wholly, or in part, in a separate network device other than the computer system 110.

Still referring to FIG. 2, video presentation 175 and user data 195 can be transceived between communications interface 115 of computer system 110 (e.g., content production platform 152) and rendering application 180 via network 177.

FIGS. 3-8 present flow charts according to embodiments herein. The rectangular elements are herein denoted "steps" and represent computer software instructions or groups of instructions. The flow diagrams do not necessarily depict the syntax of any particular programming language. Rather, the flow diagrams illustrate the functional information one of ordinary skill in the art could use to fabricate circuits or to generate computer software to perform the processing required in accordance with the present invention.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3:
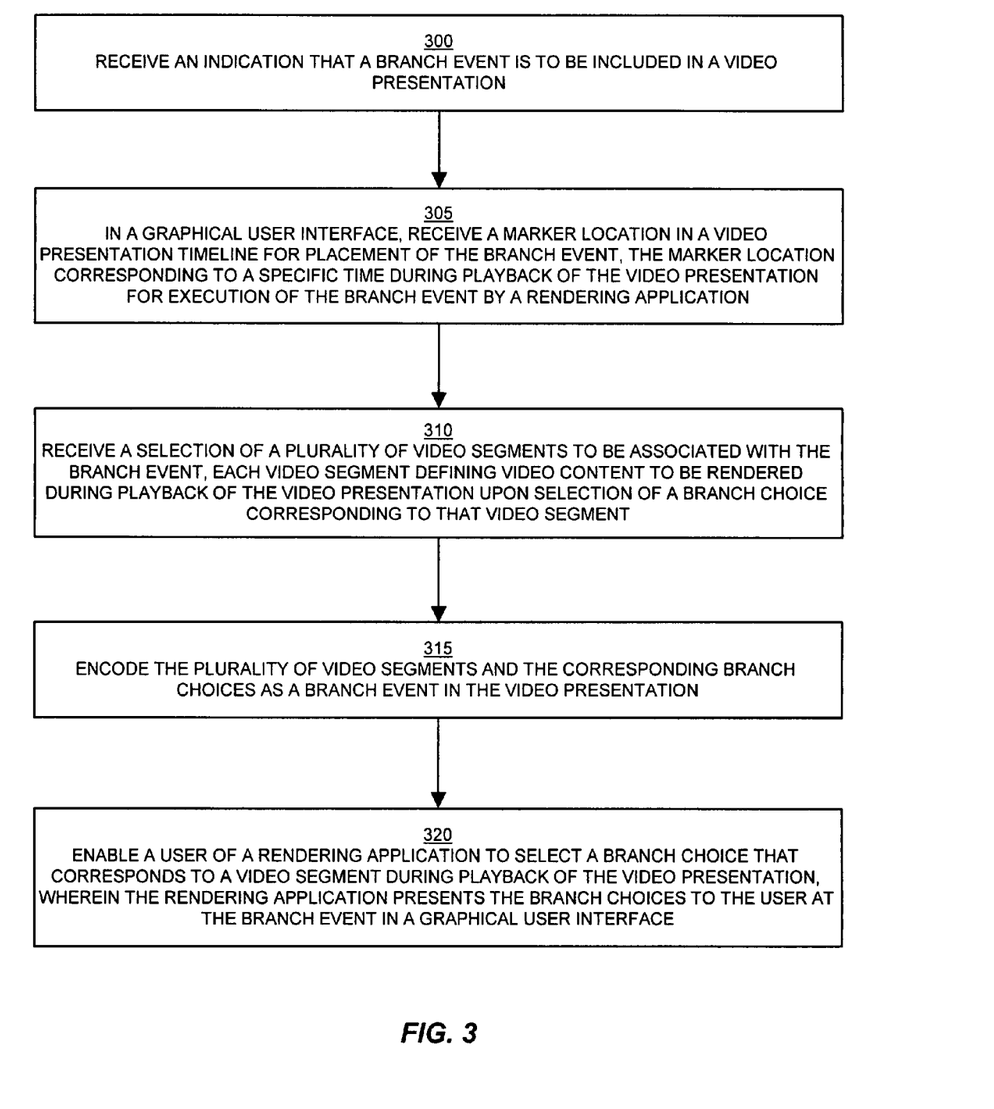
FIG. 3 is a flow chart of processing steps performed by a content manager according to embodiments herein.

Now, more specifically, FIG. 3 is a flow chart of processing steps that shows processing operations performed by the content manager 150 for in accordance with one example embodiment.

In step 300, the content manager 150 receives an indication that a branch event 154 is to be included in a video presentation 175. As shown in the example embodiment of FIG. 1, the content manager receives the indication of branch event 154 from input provided by production user 108 (e.g., movie producer, web administrator, etc.).

In step 305, in a graphical user interface 141, the content manager 150 receives a marker location in a video presentation timeline for placement of the branch event 154. As such, the marker location corresponds to a specific time during playback of the video presentation 175 for execution of the branch event 154 by a rendering application 180. The graphical user interface 141 associated with the content manager 150 is similar to the graphical user interface 181 associated with the rendering application 180 shown in the example embodiment of FIG. 1. For example, the production user 108 can insert markers representative of branch events (e.g., the arrows in graphical user interface 181 associated with branch events 154 and 155) with respect to a video presentation timeline similar to the video presentation timeline 185 depicted in FIG. 1.

In step 310, the content manager 150 receives a selection of a plurality of video segments 161 (e.g., video segments 161-1, 161-2 and 161-3) to be associated with the branch event 154. In accordance with one example embodiment, each video segment 161 defines video content to be rendered during playback of the video presentation 175 upon selection of a branch choice (e.g., branch choice selection 198) corresponding to that video segment. As shown in the example embodiment of FIG. 1, production user 108 selects video segments 161 from the video library 160 for inclusion into the video presentation 175 in association with branch event 154. It should be noted that the production user 108 can also select other content from the video library 160 for inclusion into the video presentation 175 such as, for example, static video segments 191 and 192.

In step 315, the content manager 150 encodes the video segments 161 and the corresponding branch choices as a branch event 154 in the video presentation 175. Generally, the content manager 150 stores the branch event 154 and corresponding video segments 161 in a markup language (e.g., XML) for transmission to at least one rendering application (e.g., rendering application 180). By providing a markup language for representing the video presentation 175, rendering applications (e.g., web browsers and/or Flash® Players) can be configured to interpret the markup language for execution of the branch event 154 during playback of the video presentation 175.

In step 320, the content manager 150 enables an end user 109 of a rendering application 180 to select a branch choice that corresponds to a video segment 161 during playback of the video presentation 175. For example, in one embodiment the rendering application 180 presents the branch choices to the end user 109 at the branch event 154 in a graphical user interface 181. Details of how the rendering application 180 presents the branch choices to a user are discussed further below.

Figure 4:
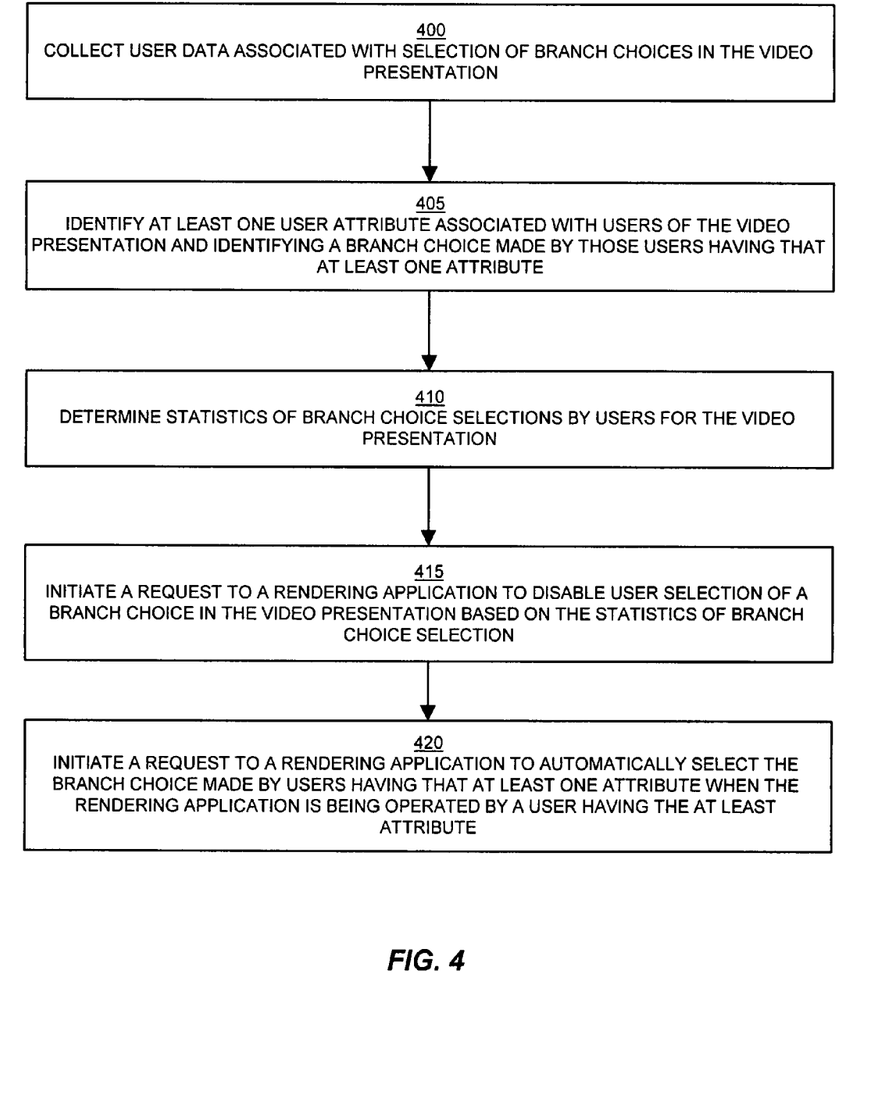
FIG. 4 is a flow chart of processing steps performed by a content manager according to embodiments herein.

FIG. 4 is a flow chart of processing steps that shows processing operations performed by the content manager 150 in accordance with one example embodiment.

In step 400, the content manager 150 collects user data 195 associated with the selection of branch choices (e.g., branch choice selection 198 provided by end user 109) in the video presentation 175. For example, in one embodiment the content manager 150 receives, from rendering application 180 via network 177, data representative of the branch choice selection 198 made by end user 109 such that the content manager 150 and/or statistics manager 151 can log the selection of the video segment 161 (e.g., for the corresponding branch event 154) for future use (e.g., market research).

In step 405, the content manager 150 identifies at least one user attribute associated with users (e.g., end user 109) of the video presentation 175 and identifies a branch choice (e.g., branch choice selection 198) made by those users having that user attribute. In one example implementation, assume that the content manager 150 and/or statistics manager 151 identifies that the end user 109 has a user attribute specifying the end user's 109 age range (e.g., 18-25 year olds). As a result, the content manager 150 selects a video segment 161 associated with branch event 154 that has been the most popular branch choice among end users having the same user attribute (e.g., the most popular branch choice for 18-25 year olds) and, in turn, transmits the video presentation 175 with the most popular video segment substituted for the branch event 154 to the rendering application 180 for playback by end user 109.

In step 410, the content manager 150 and/or statistics manager 151 determines statistics of branch choice selections by users for the video presentation 175. For example, the content manager 150 determines the most popular video segment 161 that has been selected by end users for a particular branch event in a video presentation.

In step 415, the content manager 150 initiates a request to a rendering application 180 to disable end user 109 selection of a branch choice in the video presentation 175 based on the statistics of branch choice selection 198. By disabling end user 109 selection of the branch choice, the content manager 150 can control the content of the video presentation 175 such that the end user 109 cannot interact with or determine the flow of the video presentation 175. In one embodiment, the content manager 175 disables the branch choice selection by replacing the branch event 154 with the specific video segment 161 (e.g., a static video segment) in the video presentation (e.g., in the XML file) such that the specific video segment 161 will be rendered in lieu of the branch choice 154 during playback of the video presentation 175 in the rendering application 180. As per another example embodiment, the content manager 150 transmits a separate message to the rendering application 180 to disable the branch choice 154 by indicating the specific video segment 161 to be rendered during playback of the video presentation 175 in lieu of the branch event 154.

In step 420, the content manager 150 initiates a request to a rendering application to automatically select the branch choice made by users having that at least one attribute when the rendering application is being operated by a user having the at least attribute. To distinguish step 420 from previously discussed step 415, the content manager 150 does not replace the branch event 154 in the video presentation 175 file. Instead, the content manager overrides user selection by instructing the rendering application 180 (either in the video presentation 175 file or by a separate message transmission) to render the specific video segment 161 at the branch event 154 during playback of the video presentation 175.

Figure 5:
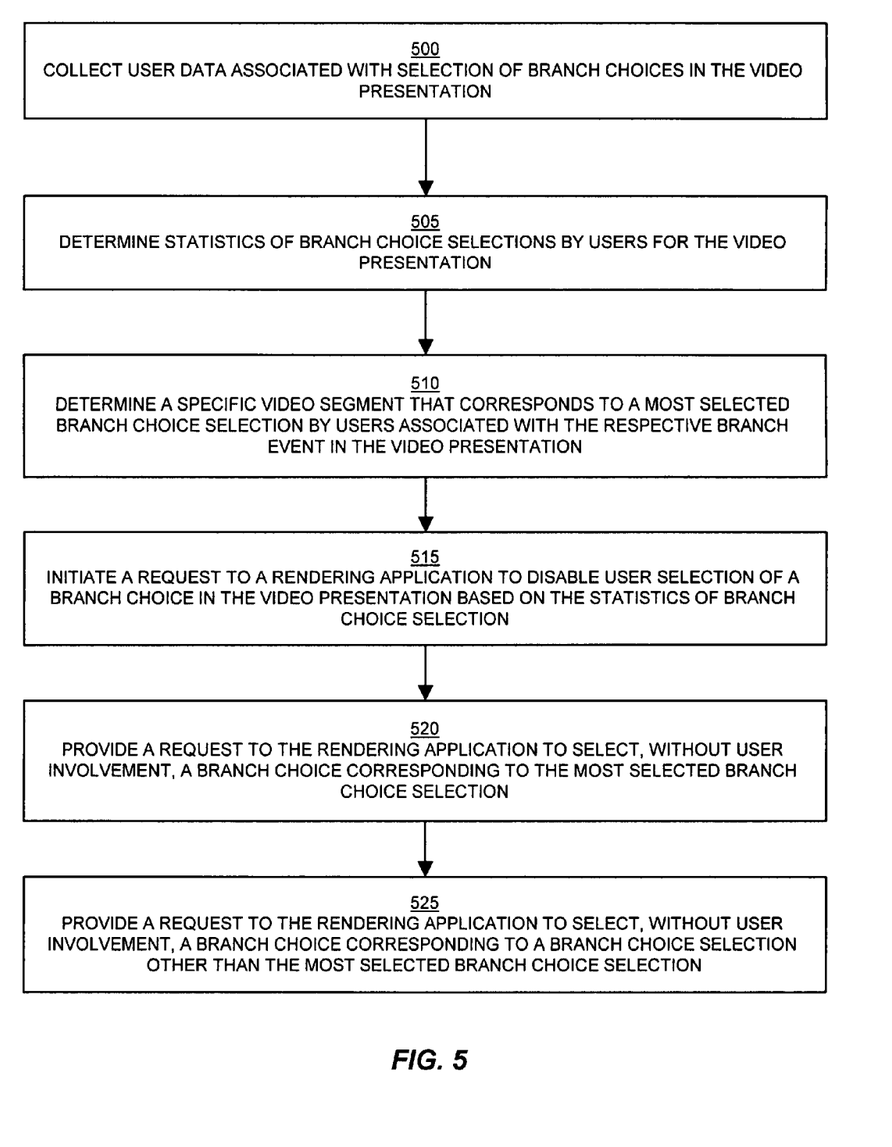
FIG. 5 is a flow chart of processing steps performed by a statistics manager according to embodiments herein.

FIG. 5 is a flow chart of processing steps that shows processing operations performed by the statistics manager 151 in accordance with one example embodiment.

In step 500, the statistics manager 151 (e.g., as part of the content manager 150 or as a stand-alone process) collects user data 195 associated with selection of branch choices (e.g., and corresponding video segments 161) in the video presentation 195. Details of the statistics manager 151 processing are discussed further in the steps below.

In step 505, the statistics manager 151 determines a specific video segment 161 that corresponds to a most selected branch choice selection 198 by end users associated with the respective branch event 154 in the video presentation 175.

In step 510, the statistics manager 151 determines statistics of branch choice selections by end users for the video presentation 175. For instance, in using the example embodiment shown in FIG. 1, the statistics manager 151 determines statistics (e.g., most viewed, least viewed, etc.) for the video segments 161-1, 161-2 and 161-3 associated with branch event 154 for multiple end users that have interacted with and provided feedback for the video presentation 175.

In step 515, the statistics manager 151 initiates a request to a rendering application 180 to disable user selection of a branch choice (e.g., associated with video segments 161) in the video presentation 175 based on the statistics of branch choice selection 198. The implementation of step 515 is similar to that of previously discussed step 415.

In step 520, the statistics manager 151 provides a request to the rendering application 180 to select, without user involvement (e.g., neither production user 108 nor end user 109), a branch choice corresponding to the most selected branch choice selection. The statistics manager 151 and/or the content manager 150 in this example embodiment provides an automated response to end user 109 feedback by providing rendering applications 180 of subsequent end users 109 with a video presentation 175 containing the most selected branch choice (e.g., video segment 161-2) in place of the respective branch event 154. Such techniques may be used in performing automated market research analysis with real-time feedback and distribution.

In step 525, the statistics manager 151 provides a request to the rendering application to select, without user involvement, a branch choice corresponding to a branch choice selection other than the most selected branch choice selection.

Figure 6:
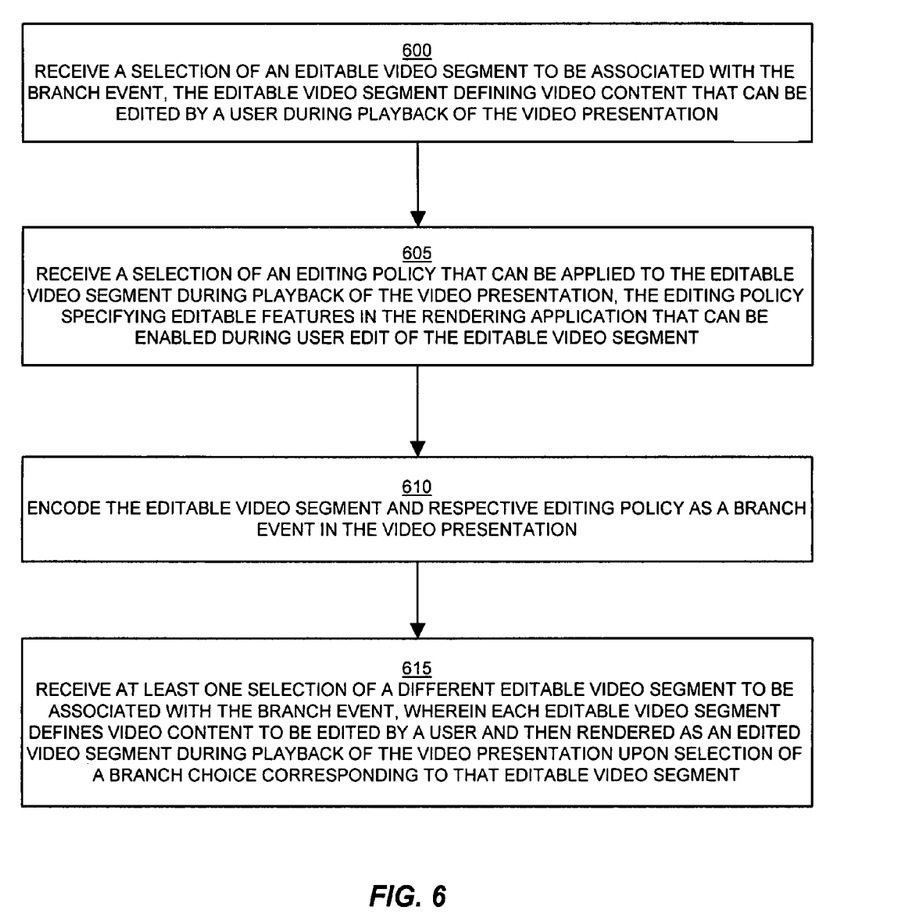
FIG. 6 is a flow chart of processing steps performed by a content manager according to embodiments herein.

FIG. 6 is a flow chart of processing steps that shows processing operations performed by the content manager 150 in accordance with one example embodiment.

In step 600, the content manager 150 receives (e.g., from production user 108) a selection of an editable video segment 173 to be associated with a branch event 155. In one example embodiment, the editable video segment 173 defines video content that can be edited by an end user 109 during playback of the video presentation 175.

In step 605, the content manager 150 receives (e.g., from production user 108) a selection of an editing policy 171 that can be applied to the editable video segment 173 during playback of the video presentation 175. In particular, the editing policy 171 specifies editing features 171-1, 171-2 and 171-3 in the rendering application 180 that can be enabled and/or disabled during end user 109 edit of the editable video segment 173. Depending on the type and version of the rendering application 180 being used, the editing features may include, for example, transitioning effects (e.g., fade in, fade out, etc.), superimposition of captions and subtitles, adding background audio/music, adjusting the color, contrast, etc., of the video display, and other various editing features suitable for the creative production of content in a rendering and/or editing application 180.

It should be noted that in particular embodiments the end user 109 can also edit and modify the editable video segment 173, in accordance with editing policy 171, in an editing application (e.g., video editor) that is separate from the rendering application 180 (e.g., Flash® Player). As in one example embodiment, upon editing and/or modifying the editable video segment 173 in an editing application, the end user 109 can then subsequently view the playback of the video presentation 175 in the rendering application 180. In such an example configuration, the editing application and rendering application 180 can both reside on the same device (e.g., computer system 110) or on separate devices as executable code.

In yet another example embodiment, both the editing application and rendering application 180 (e.g., a remix viewer for rendering branch choice selections during playback of a video presentation 175) are executed as part single application such as, for example, Flash®Player. More specifically, in such an embodiment the editing capabilities of the editing application require a set of logic that the single application (e.g., Flash® Player) can use to create an editing environment for the end user 109. The rendering application 180 (e.g., remix viewer), on the other hand, uses a subset of the editing logic in combination with the single application (e.g., Flash® Player) to provide the branch choice selection capabilities (e.g., remix capabilities) to the end user 109.

In step 610, the content manager 150 encodes the editable video segment 173 and respective editing policy 171 as a branch event 155 in the video presentation 175. Generally, the content manager 150 stores the branch event 155 in a markup language (e.g., XML) for transmission to at least one rendering application 180. In addition, the rendering applications 180 are configured to interpret the markup language for execution of the branch event 155 during playback of the video presentation 175.

In step 615, the content manager 150 receives at least one selection of a different editable video segment to be associated with the branch event 155. Each editable video segment 173 defines video content to be edited by an end user 109 and then rendered as an edited video segment during playback of the video presentation 175 upon selection of a branch choice corresponding to that editable video segment 173. Thus, according to an example embodiment, the content manager 150 can create a branch event 155 having branch choices that are editable video segments 173 with corresponding editing policies 171.

Figure 7:
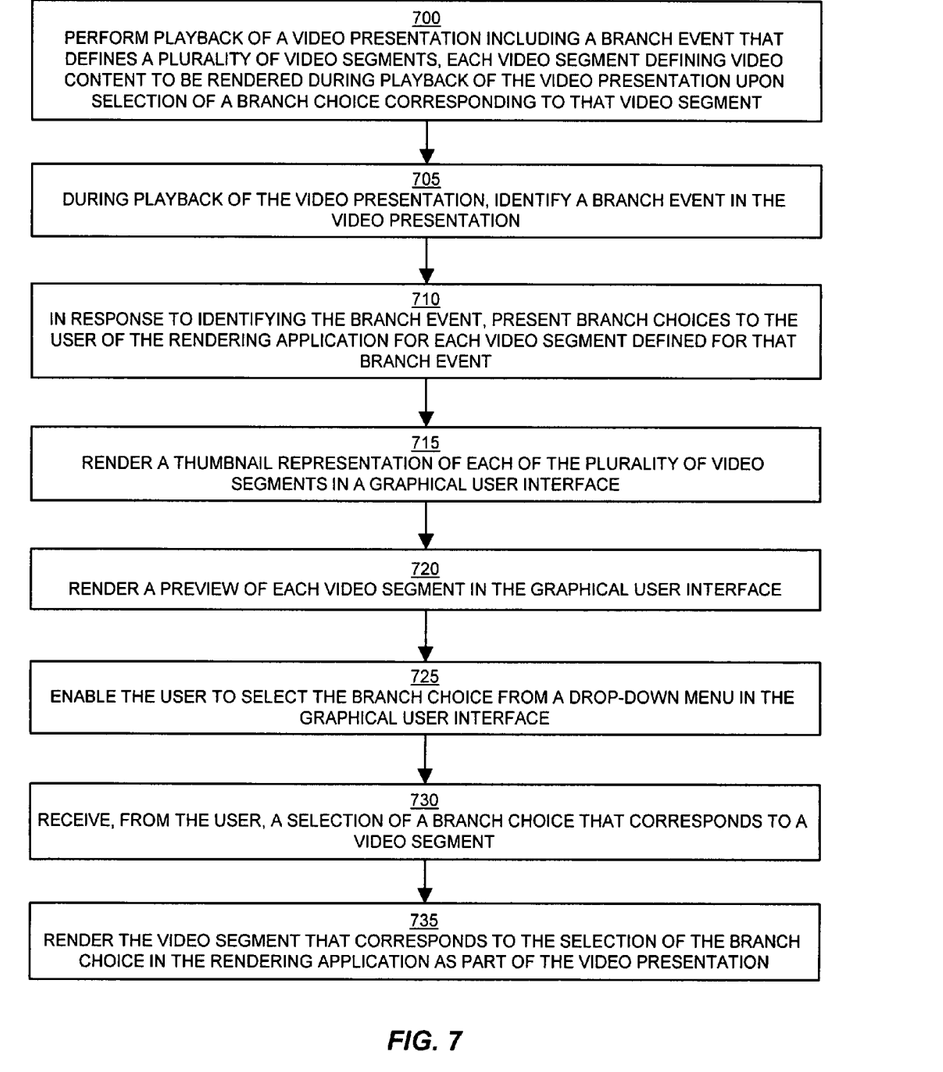
FIG. 7 is a flow chart of processing steps performed by a rendering application according to embodiments herein.

FIG. 7 is a flow chart of processing steps that shows processing operations performed by the rendering application 180 in accordance with one example embodiment.

In step 700, the rendering application 180 performs playback of a video presentation 175 including a branch event 154 that defines a plurality of video segments 161. Furthermore, each video segment 161 defines video content to be rendered during playback of the video presentation 175 upon selection of a branch choice corresponding to that video segment 161.

In step 705, during playback of the video presentation 175, the rendering application 180 identifies a branch event 154 in the video presentation 175.

In step 710, in response to identifying the branch event 154, the rendering application 180 presents branch choices to the end user 109 of the rendering application 180 for each video segment 161 defined for that branch event. Details of such processing are discussed in the steps below.

In step 715, the rendering application 180 renders a thumbnail representation of each of the plurality of video segments 161 in a graphical user interface 181. Typically, the thumbnail representations of the video segments 161 are graphically presented to the end user 109 in the presentation area 182 of graphical user interface 181. In one example embodiment, the thumbnail representation of a video segment 161 includes a screen capture of a frame of the video segment 161 and/or a caption describing the content of the video segment 161.

In step 720, the rendering application 180 renders a preview of each video segment 161 in the graphical user interface 180. According to one example embodiment, the rendering application 180 plays a short clip (e.g., five seconds) of each video segment 161 either in the presentation area 182 of the graphical user interface 181 and/or as a thumbnail as described in step 715.

In step 725, the rendering application 180 enables the user to select the branch choice from a drop-down menu in the graphical user interface 181.

In step 730, the rendering application 180 receives, from the end user 109, a selection of a branch choice (e.g., branch choice selection 198) that corresponds to a video segment 161.

In step 735, the rendering application 180 renders the video segment 161 that corresponds to the selection of the branch choice (e.g., branch choice selection 198) as part of the video presentation 175. Note that the rendering application 180 may store or log the branch choice selection 198 as user data 195 to provide feedback to the content manager 150 and/or statistics manager 151 as previously discussed.

Figure 8:
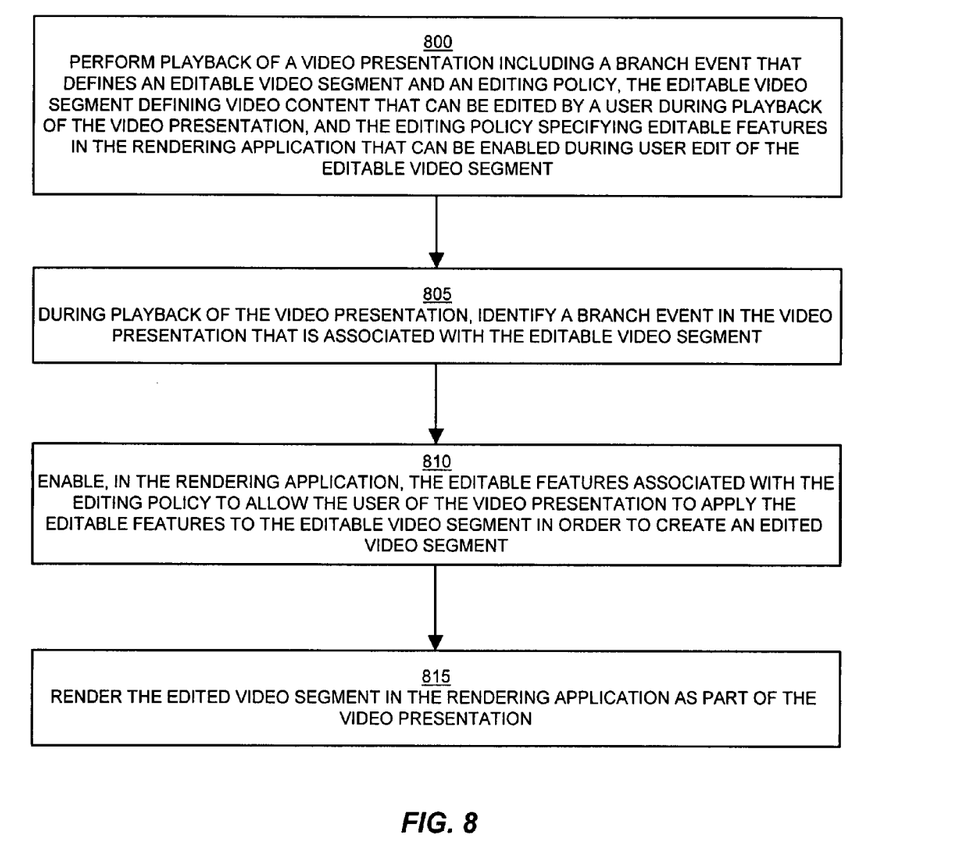
FIG. 8 is a flow chart of processing steps performed by a rendering application according to embodiments herein.

FIG. 8 is a flow chart of processing steps that shows processing operations performed by the rendering application 180 in accordance with one example embodiment.

In step 800, the rendering application 180 performs playback of a video presentation 175 including a branch event 155 that defines an editable video segment 173 and an editing policy 171. As per one example embodiment, the editable video segment 173 defines video content that can be edited by an end user 109 during playback of the video presentation 175. Additionally, the editing policy 171 specifies editing features 171-1, 171-2 and 171-3 (e.g., adding background music) in the rendering application 180 that can be enabled during end user 109 edit of the editable video segment 173.

In step 805, during playback of the video presentation 175, the rendering application 180 identifies a branch event 155 in the video presentation 175 that is associated with the editable video segment 173.

In step 810, the rendering application 180 enables the editing features 171-1, 171-2 and 171-3 associated with the editing policy 171 to allow the end user 109 of the video presentation 175 to apply the editing features 171-1, 171-2 and 171-3 to the editable video segment 173 in order to create an edited video segment. Note that in the example embodiment depicted in Figure, editing feature 193 is disabled during end user 109 edit since the editing policy 171 does not include editing feature 193.

In step 815, the rendering application 180 renders the edited video segment (e.g., the editable video segment 173 as modified by end user 109) as part of the video presentation 175.

Those skilled in the art should readily appreciate that the programs and methods for implementing a content manager, statistics manager and/or rendering application defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for event processing in a content editor has been particularly shown and described with references to embodiments thereof, it will be understood by those skilled in the art that various changes in form and details may be made therein without departing from the scope of the invention encompassed by the appended claims.

What we claim is:

1. A method comprising:
receiving an indication that a branch event is to be included in a video presentation;
receiving a selection of a plurality of video segments to be associated with the branch event as branch choices, each video segment defining video content to be rendered during playback of the video presentation upon selection of a branch choice corresponding to that video segment;
collecting data associated with branch choice selections in the video presentation, the data including an attribute associated with users of the video presentation and branch choice selections made by users having that attribute;
determining, based on the collected data, statistics of branch choice selections by the users of the video presentation; and
encoding the plurality of video segments and the corresponding branch choices as a branch event in the video presentation, the branch choices to be presented for selection at times specified by the branch event of one of the branch choices to render the video segment corresponding to a selected branch choice, wherein the branch choices to be presented are based at least in part on the statistics.

2. The method of claim 1 wherein receiving an indication that a branch event is to be included in a video presentation comprises:
in a graphical user interface, receiving a marker location in a video presentation timeline for placement of the branch event, the marker location corresponding to a specific time during playback of the video presentation for execution of the branch event by a rendering application.

3. The method of claim 1 comprising:
enabling a rendering application to receive a selection of a branch choice that corresponds to a video segment during playback of the video presentation, wherein the rendering application presents the branch choices at the branch event in a graphical user interface.

4. The method of claim 1 comprising:
collecting user data associated with selection of branch choices in the video presentation;
determining statistics of branch choice selections by users for the video presentation; and
initiating a request to a rendering application to disable user selection of a branch choice in the video presentation based on the statistics of branch choice selection.

5. The method of claim 4 wherein determining statistics of branch choice selection by users for the video presentation comprises:
determining a specific video segment that corresponds to a most selected branch choice selection by users associated with the respective branch event in the video presentation; and
wherein initiating a request to a rendering application to disable user selection of a branch choice in the video presentation provides at least one of the group consisting of:
a request to the rendering application to select, without user involvement, a branch choice corresponding to the most selected branch choice selection; and
a request to the rendering application to select, without user involvement, a branch choice corresponding to a branch choice selection other than the most selected branch choice selection.

6. The method of claim 4 wherein collecting user data associated with selection of branch choices in the video presentation comprises:
  identifying at least one user attribute associated with users of the video presentation and identifying a branch choice made by those users having that at least one attribute; and
  wherein initiating a request to a rendering application to disable user selection of a branch choice in the video presentation based on the statistics of branch choice selection comprises:
  initiating a request to a rendering application to automatically select the branch choice made by users having that at least one attribute when the rendering application is being operated by a user having the at least attribute.

7. The method of claim 1 wherein encoding the plurality of video segments and the corresponding branch choices as a branch event in the video presentation comprises:
  storing the branch event and associated branch choices and corresponding video segments in a markup language for transmission to at least one rendering application, the markup language representing the video presentation, the at least one rendering application configured to interpret the markup language for execution of the branch event during playback of the video presentation.

8. The method of claim 1 comprising:
  receiving a selection of an editable video segment to be associated with the branch event, the editable video segment defining video content that can be edited by a user during playback of the video presentation.

9. The method of claim 8 comprising:
  receiving a selection of an editing policy that can be applied to the editable video segment during playback of the video presentation, the editing policy specifying editing features in the rendering application that can be enabled during user edit of the editable video segment; and
  encoding the editable video segment and respective editing policy as a branch event in the video presentation.

10. The method of claim 8 comprising:
  receiving at least one selection of a different editable video segment to be associated with the branch event, wherein each editable video segment defines video content to be edited by a user and then rendered as an edited video segment during playback of the video presentation upon selection of a branch choice corresponding to that editable video segment.

11. The method of claim 8 wherein encoding the editable video segment and respective editing policy as a branch event in the video presentation comprises:
  storing the branch event in a markup language for transmission to at least one rendering application, the at least one rendering application configured to interpret the markup language for execution of the branch event during playback of the video presentation.

12. A method comprising:
  performing, by a rendering application playback of a video presentation including a branch event that defines a plurality of editable video segments as branch choices and an editing policy specifying editing features that can be enabled, each editable video segment defining video content configured to be edited during playback of the video presentation upon selection of a branch choice corresponding to that video segment;
  during playback of the video presentation:
    identifying a branch event in the video presentation; and
    enabling, according to the editing policy, editing features of the rendering application selectable to create an edited video segment;
  in response to identifying the branch event, presenting the branch choices for each editable video segment defined for that branch event for selection of one of the branch choices to render the editable video segment corresponding to a selected branch choice;
  receiving a selection of a branch choice corresponding to a selected editable video segment; and
  rendering the editable video segment corresponding to the selected branch choice in the rendering application as part of the video presentation.

13. The method of claim 12 wherein presenting branch choices for each video segment defined for that branch event provides at least one of the group consisting of:
  rendering a thumbnail representation of each of the plurality of video segments in a graphical user interface;
  rendering a preview of each video segment in the graphical user interface; and
  enabling the rendering application to receive a selection of a branch choice from a drop-down menu in the graphical user interface.

14. The method of claim 12 comprising:
  performing playback of a video presentation including a branch event that defines the editable video segment and the editing policy, the editable video segment defining video content that can be edited by a user during playback of the video presentation, and the editing policy specifying editing features in the rendering application that can be enabled during user edit of the editable video segment;
  during playback of the video presentation, identifying a branch event in the video presentation that is associated with the editable video segment;
  enabling, in the rendering application, the editing features associated with the editing policy to allow the user of the video presentation to apply the editing features to the editable video segment in order to create an edited video segment; and
  rendering the edited video segment in the rendering application as part of the video presentation.

15. A method comprising:
  receiving an indication that a branch event is to be inserted at a specific time in a video presentation;
  receiving a selection of a plurality of video segments to be associated with the branch event, each video segment defining video content to be rendered during playback of the video presentation upon selection of a branch choice corresponding to that video segment, the selection of a branch choice provided to a rendering application;
  collecting, by a statistics manager, data associated with branch choice selections in the video presentation, the data including at least one attribute associated with users of the video presentation and branch choice selections made by users having the at least one attribute;
  determining, by the statistics manager, statistics of branch choice selections by the users of the video presentation, the statistics including popularity of branch choice selections by users having the at least one attribute;
  encoding the plurality of video segments and the corresponding branch choices as a branch event in the video presentation, wherein the encoding is a markup language file for interpretation by the rendering application during playback of the video presentation; and enabling selection of a branch choice that corresponds to a video segment during playback of the video presentation, wherein the rendering application presents the branch choices at the specific time in the video presentation based at least in part on the statistics and as indicated by the branch event in the markup language file.

16. A computer system comprising:
a processor;
a display; and
a memory having instructions stored thereon that when executed by the processor, cause the processor to implement a video production application configured to perform operations comprising:
receiving an indication that a branch event is to be included in a video presentation;
receiving a selection of a plurality of video segments to be associated with the branch event as branch choices, each video segment defining video content to be rendered during playback of the video presentation upon selection of a branch choice corresponding to that video segment;
collecting data associated with branch choice selections in the video presentation, the data including an attribute associated with users of the video presentation and branch choice selections made by users having that attribute;
determining, based on the collected data, statistics of branch choice selections by the users of the video presentation;
encoding the plurality of video segments and the corresponding branch choices as a branch event in the video presentation, the branch choices to be presented for selection at times specified by the branch event of one of the branch choices to render the video segment corresponding to a selected branch choice; and
enabling a rendering application to receive a selection of a branch choice during playback of the video presentation, wherein the rendering application presents the branch choices based at least in part on the statistics at times specified by the branch event in a graphical user interface.

17. The computer system of claim 16, the operations further comprising:
receiving a selection of an editable video segment to be associated with the branch event, the editable video segment defining video content that can be edited by a user during playback of the video presentation;
receiving a selection of an editing policy that can be applied to the editable video segment during playback of the video presentation, the editing policy specifying editing features in the rendering application that can be enabled during user edit of the editable video segment; and
encoding the editable video segment and respective editing policy as a branch event in the video presentation.

18. A computer readable storage medium having instructions stored thereon that when executed by a computing device, cause the computing device to perform operations comprising:
receiving an indication that a branch event is to be included in a video presentation;
receiving a selection of a plurality of video segments to be associated with the branch event as branch choices, each video segment defining video content to be rendered during playback of the video presentation upon selection of a branch choice corresponding to that video segment;
collecting data associated with branch choice selections in the video presentation, the data including an attribute associated with users of the video presentation and branch choice selections made by users having that attribute;
determining, based on the collected data, statistics of branch choice selections by the users of the video presentation;
encoding the plurality of video segments and the corresponding branch choices as a branch event in the video presentation, the branch choices to be presented for selection at times specified by the branch event of one of the branch choices to render the video segment corresponding to a selected branch choice; and
enabling a rendering application to receive the selection of a branch choice during playback of the video presentation, wherein the rendering application presents the branch choices based on the statistics at times specified by the branch event in a graphical user interface.

19. The computer readable medium of claim 18 comprising:
collecting user data associated with selection of branch choices in the video presentation;
determining statistics of branch choice selection by users for the video presentation; and
initiating a request to a rendering application to disable user selection of a branch choice in the video presentation based on the statistics of branch choice selection.

20. The computer readable medium of claim 19 wherein determining statistics of branch choice selection by users for the video presentation comprises:
determining a specific video segment that corresponds to a most selected branch choice selection by users associated with the respective branch event in the video presentation; and
wherein initiating a request to a rendering application to disable user selection of a branch choice in the video presentation provides at least one of the group consisting of:
a request to the rendering application to select, without user involvement, a branch choice corresponding to the most selected branch choice selection; and
a request to the rendering application to select, without user involvement, a branch choice corresponding to a branch choice selection other than the most selected branch choice selection.

21. The computer readable storage medium of claim 19 wherein collecting user data associated with selection of branch choices in the video presentation comprises:
identifying at least one user attribute associated with users of the video presentation and identifying a branch choice made by those users having that at least one attribute; and
wherein initiating a request to a rendering application to disable user selection of a branch choice in the video presentation based on the statistics of branch choice selection comprises:
initiating a request to a rendering application to automatically select the branch choice made by users having that at least one attribute when the rendering application is being operated by a user having the at least attribute.

22. A computer readable storage medium having computer readable code stored thereon that, when executed by a computer, cause the computer to perform video editing, the computer readable code comprising instructions for:

performing playback of a video presentation including a branch event that defines a plurality of editable video segments as branch choices and an editing policy specifying editing features that can be enabled during playback, each editable video segment defining video content configured to be edited during playback of the video presentation upon selection of a branch choice corresponding to that editable video segment;

during playback of the video presentation:
  identifying a branch event in the video presentation; and
  enabling, according to the editing policy, editing features selectable to create an edited video segment;

in response to identifying the branch event, presenting the branch choices for each editable video segment defined for that branch event for selection of one of the branch choices to render the editable video segment corresponding to a selected branch choice;

receiving a selection of a branch choice corresponding to a selected editable video segment; and rendering the editable video segment corresponding to the selected branch choice in the rendering application as part of the video presentation.

23. The method of claim 1 comprising:
providing a capability for at least one user to share the video presentation with at least one other user, the video presentation comprising the video segment, corresponding to the selection of the branch choice, rendered during playback by the at least one user.

24. The method of claim 4 wherein collecting user data associated with selection of branch choices in the video presentation comprises:
providing a capability to collect, in real-time, user data from a plurality of users.

25. The method of claim 12 wherein presenting branch choices for each video segment defined for that branch event comprises:
rendering a caption describing the contents of the video segment.

* * * * *